US010762099B2

(12) United States Patent
Wei et al.

(10) Patent No.: US 10,762,099 B2
(45) Date of Patent: Sep. 1, 2020

(54) SYNTACTICAL TRANSFORMATION OF DATABASE INTERACTION STATEMENTS

(71) Applicant: International Business Machines Corporation, Armonk, NY (US)

(72) Inventors: Dong Jie Wei, Beijing (CN); Ke Wei Wei, Beijing (CN); Xin Ying Yang, Beijing (CN); Miao Zheng, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 347 days.

(21) Appl. No.: 15/175,593

(22) Filed: Jun. 7, 2016

(65) Prior Publication Data

US 2017/0351684 A1 Dec. 7, 2017

(51) Int. Cl.
*G06F 16/00* (2019.01)
*G06F 16/25* (2019.01)
*G06F 16/23* (2019.01)
*G06F 16/21* (2019.01)

(52) U.S. Cl.
CPC .......... *G06F 16/252* (2019.01); *G06F 16/212* (2019.01); *G06F 16/23* (2019.01)

(58) Field of Classification Search
CPC .......... G06F 17/3056; G06F 17/30294; G06F 17/30345; G06F 16/252; G06F 16/212; G06F 16/23; G06F 16/25
USPC ....................................................... 707/756
See application file for complete search history.

(56) References Cited

U.S. PATENT DOCUMENTS

| | | | | |
|---|---|---|---|---|
| 5,608,904 A | * | 3/1997 | Chaudhuri | G06F 16/30 |
| 5,966,709 A | * | 10/1999 | Zhang | H03M 7/3084 |
| 6,629,094 B1 | * | 9/2003 | Colby | G06F 16/24539 |
| | | | | 707/713 |
| 6,785,673 B1 | * | 8/2004 | Fernandez | G06F 40/151 |
| 7,027,975 B1 | * | 4/2006 | Pazandak | G06F 16/3344 |
| | | | | 704/9 |
| 7,080,019 B1 | * | 7/2006 | Hurzeler | G06Q 10/025 |
| | | | | 705/6 |
| 7,233,939 B1 | | 6/2007 | Ziauddin | |
| 7,711,675 B2 | * | 5/2010 | Anonsen | G06F 16/289 |
| | | | | 707/759 |
| 10,025,571 B1 | * | 7/2018 | Boulos | G06F 8/443 |

(Continued)

OTHER PUBLICATIONS

Wei et al., "Syntactical Transformation of Database Interaction Statements", U.S. Appl. No. 15/795,450, filed Oct. 27, 2017, 30 pages.

(Continued)

*Primary Examiner* — Mark E Hershley
(74) *Attorney, Agent, or Firm* — Andrew Aubert

(57) ABSTRACT

A computer-implemented method includes identifying a primary database interaction statement and determining one or more intermediate database interaction statements based on the primary database interaction statement. The computer-implemented further includes determining, for each of the one or more intermediate database interaction statements, an intermediate statement transformation indicator. The computer-implemented method further includes determining one or more transformed database interaction statements based on each intermediate statement transformation indicator. A corresponding computer program product and computer system are also disclosed.

18 Claims, 4 Drawing Sheets

(56) References Cited

U.S. PATENT DOCUMENTS

| | | | |
|---|---|---|---|
| 2001/0033639 A1* | 10/2001 | Martin | H04M 3/5307 379/88.14 |
| 2003/0055814 A1* | 3/2003 | Chen | G06F 16/24537 |
| 2004/0002941 A1 | 1/2004 | Thorne | |
| 2004/0193807 A1 | 9/2004 | Mogi | |
| 2005/0234965 A1* | 10/2005 | Rozenshtein | G06F 17/10 |
| 2005/0251812 A1* | 11/2005 | Hayward | G06F 16/258 719/328 |
| 2007/0027905 A1* | 2/2007 | Warren | G06F 8/51 |
| 2007/0156670 A1 | 7/2007 | Lim | |
| 2007/0160067 A1* | 7/2007 | Hayward | G06F 16/258 370/397 |
| 2007/0239669 A1* | 10/2007 | Ordonez | G06F 16/2453 |
| 2008/0228658 A1* | 9/2008 | Crean | G06Q 30/02 705/80 |
| 2009/0125892 A1* | 5/2009 | Crewdson | G06F 8/10 717/136 |
| 2010/0005077 A1 | 1/2010 | Krishnamurthy | |
| 2010/0088315 A1* | 4/2010 | Netz | G06F 16/24561 707/737 |
| 2010/0121868 A1* | 5/2010 | Biannic | G06F 16/242 707/759 |
| 2010/0121869 A1* | 5/2010 | Biannic | G06F 16/283 707/759 |
| 2011/0184963 A1* | 7/2011 | Singh | H04L 29/06068 707/755 |
| 2011/0191407 A1* | 8/2011 | Fu | G06F 8/38 709/203 |
| 2012/0016655 A1* | 1/2012 | Travieso | G06F 16/248 704/2 |
| 2013/0024418 A1* | 1/2013 | Sitrick | G06Q 10/101 707/608 |
| 2014/0149446 A1* | 5/2014 | Kuchmann-Beauger | G06F 16/242 707/763 |
| 2014/0214912 A1* | 7/2014 | Barber | G06F 16/24558 708/490 |
| 2014/0236579 A1* | 8/2014 | Kurz | G06F 40/284 704/9 |
| 2014/0304251 A1* | 10/2014 | Bornea | G06F 16/2453 707/718 |
| 2015/0112953 A1* | 4/2015 | Nair | G06F 16/283 707/694 |
| 2015/0149436 A1* | 5/2015 | McKenna | G06F 16/2453 707/714 |
| 2015/0220597 A1* | 8/2015 | Simhadri | G06F 16/24534 707/797 |
| 2015/0379080 A1* | 12/2015 | Jochimski | G06F 16/24539 707/600 |
| 2016/0098448 A1* | 4/2016 | McShane | G06F 16/24534 707/713 |
| 2016/0328442 A1* | 11/2016 | Waas | G06F 16/252 |
| 2019/0005011 A9* | 1/2019 | Sitrick | G06F 3/04845 |

OTHER PUBLICATIONS

IBM, "List of IBM Patents or Patent Applications Treated as Related", Appendix P, 2 pages, dated Oct. 30, 2017.

* cited by examiner

SYNTACTICAL TRANSFORMATION OF DATABASE INTERACTION STATEMENTS

BACKGROUND

The present invention relates generally to the field of database systems, and more particularly to syntactical transformation of database interaction statements.

In the context of database systems, the structure of database interaction statements can have consequence for database performance. Inefficient statement structures negatively affect user experience when interacting with a database system. Developers and users of database systems continue to have difficulties with the quality of service on those systems.

SUMMARY

A computer-implemented method includes identifying a primary database interaction statement and determining one or more intermediate database interaction statements based on the primary database interaction statement. The computer-implemented further includes determining, for each of the one or more intermediate database interaction statements, an intermediate statement transformation indicator. The computer-implemented method further includes determining one or more transformed database interaction statements based on each intermediate statement transformation indicator. A corresponding computer program product and computer system are also disclosed.

DETAILED DESCRIPTION

Figure 1:
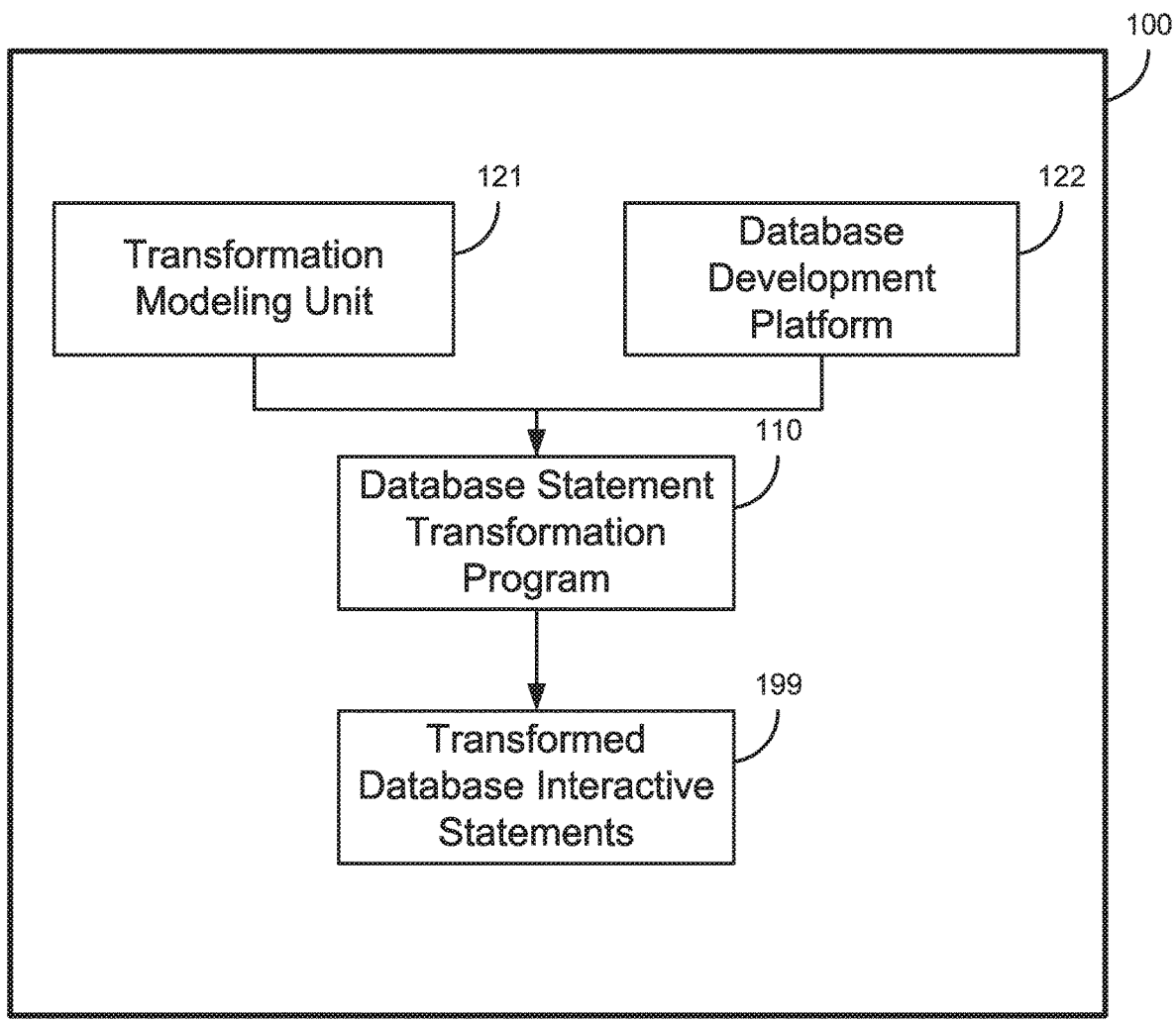
FIG. 1 is a block diagram of one embodiment of a computer system environment suitable for operation of a database statement transformation program, in accordance with at least one embodiment of the present invention.

FIG. 1 is a computer system environment 100 suitable for operating a database statement transformation program 110, in accordance with at least one embodiment of the present invention. In the embodiment depicted in FIG. 1, the program 110 uses information artefacts provided by a transformation modeling unit 121 and a database development platform 122 to determine one or more transformed database interaction statements 199. In at least some embodiments, a transformation modeling unit 121 is any combination of one or more computer (hardware or software components) that, in whole or in part, provide at least one information artefact about how to transform a database interaction statement (e.g., at least one information artefact about a transformation eligibility pattern, an intermediate statement evaluation guideline, and/or a transformed statement generation guideline). In at least some embodiments, a database interaction statement is any computer statement that can, during regular and non-exceptional executions, be used to do at least one of selecting, inserting, deleting, and updating data in a database system. Examples of database interaction statements include the following statements in a structured query language (SQL): SELECT, UPDATE, MERGE, INSERT, and DELETE. In at least some embodiments, a database interaction statement is a statement in a database manipulation language. In at least some embodiments, a database development platform 122 is any combination of one or more computer (hardware or software components) that, in whole or in part and during regular and non-exceptional executions, communicate at least one database interaction statement to the database transformation program 110 and/or to at least one database management system.

In the computer system environment 100 depicted in FIG. 1, a transformed database interaction statement 199 is any combination of one or more data artefacts that, directly or when interpreted along with other one or more data artefacts, indicate at least one information artefact about at least one database interaction statement after one or more determinations and/or transformations made by the database statement transformation program 110 on the at least one database interaction statement. In at least some embodiments, the one or more determinations and/or transformations made by the program 110 on the at least one database interaction statement are based on at least one property (e.g., the output of execution) associated with an intermediate database interaction statement determined based on the at least one database interaction statement.

Figure 2:
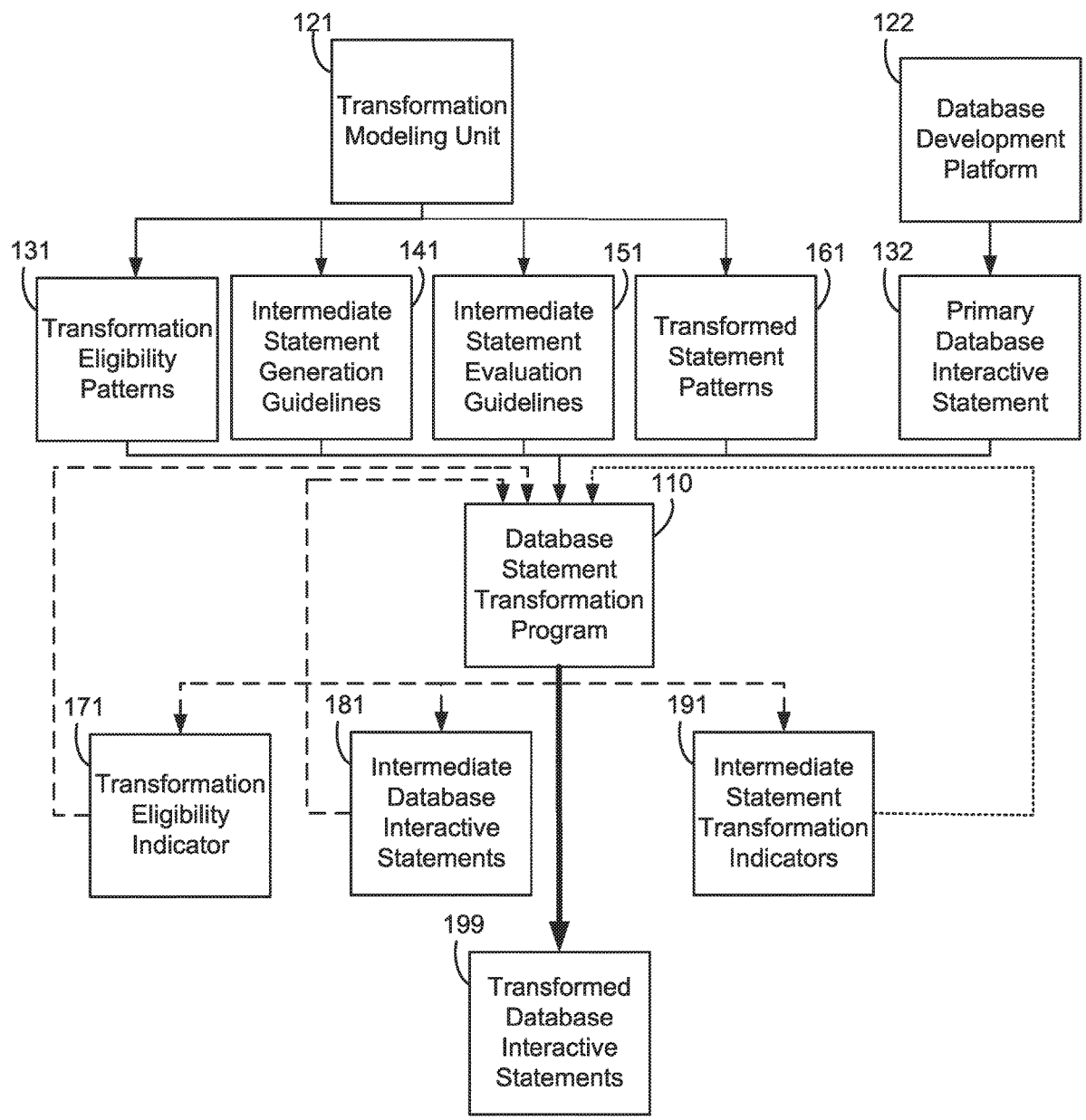
FIG. 2 is a data flow diagram of a database statement transformation program, in accordance with at least one embodiment of the present invention.

FIG. 2 is a data-flow diagram of a database statement transformation program 110, in accordance with at least one embodiment of the present invention. In the embodiment depicted in FIG. 2, the program 110 receives a primary database interaction statement (i.e., a database interaction statement before any syntactical transformation by the program 110) from the database development platform 122. The program 110 uses the primary database interaction statement 132 and a transformation eligibility pattern 131 to determine a transformation eligibility indicator 171 associated with the primary database interaction statement 132. In at least some embodiments, a transformation eligibility pattern 131 is any combination of one or more data artefacts that, directly or when interpreted along with other one or more data artefacts, indicate at least one information artefact about when the primary database interaction statement 132 is eligible for syntactical transformation. In at least some embodiments, a transformation eligibility indicator 171 is any combination of one or more data artefacts that, directly or when interpreted along with other one or more data artefacts, indicate at least one information artefact about whether the primary database interaction statement 132 complies with at least one transformation eligibility pattern 131 (e.g., based on at least one guideline about when a database interaction statement complies with a particular transformation eligibility pattern 131). In some embodiments, a transformation eligibility pattern 131 indicates the following database statement pattern (the "sum-constant pattern"):

A database interaction statement complying with the syntactical pattern:
```
SELECT ...
    [CASE WHEN COLUMN = CONSTANT THEN JUMP_FACTOR_1 ELSE
    JUMP_FACTOR_2 END,]_n
    WHERE ... COLUMN = DETERMINANT_FACTOR
    FROM TABLE;
```
Wherein DETERMINANT_FACTOR is either a CONSTANT_RETURNING_FUNCTION OR a CONSTANT_VALUE Pattern 1

In the database statement pattern in Pattern 1, COLUMN represents a particular column in the table TABLE. CONSTANT represents any constant value and Jump_Factor_1 and Jump_Factor_2 are constant or variable factors. The CONSTANT_RETURNING_FUNCTION is a function that during regular and non-exceptional executions always results in a constant value and the CONSTANT_VALUE is a constant value. In at least some embodiments, a database interaction statement complies with the database statement pattern in Pattern 1 when it comprises: (i) one or more CASE predicates testing for the equality of a column and a constant value; and (ii) a WHERE predicate that tests whether the column is equal to either a constant returning function or a constant value.

In an exemplary embodiment, the following database interaction statement complies with the database statement pattern in Pattern 1:

```
SELECT COUNT (*),
    SUM(CASE WHEN WHRG_SCHL_ISO = X'202020' THEN 1 ELSE 0
    END) AS X20,
SUM(CASE WHEN WHRG_SCHL_ISO = X'404040' THEN 2 ELSE 0
END) AS X40,
FROM T1
WHERE WHRG_SCHL_ISO = SUBSTR(X'4040404040',1,3);
```

Example 1

In the embodiment depicted in FIG. 2, if the database statement transformation program 110 determines that the primary database interaction statement is eligible for at least one syntactical transformation (e.g., if the program 110 determines that the primary database interaction statement complies with at least one transformation eligibility pattern 131), the program 110 determines one or more intermediate database interaction statements 181 based on the primary database interaction statement 132 based on one or more intermediate statement generation guidelines 141. In at least some embodiments, an intermediate statement generation guideline 141 is any combination of one or more data artefacts that, directly or when interpreted along with other one or more data artefacts, indicate at least one information artefact about how at least one intermediate database interaction statement 181 should be determined based on the primary database interaction statement 132. In at least some embodiments, an intermediate statement generation guideline 141 is determined based on an intermediate statement pattern, wherein the intermediate statement pattern comprises at least one information artefact about the syntactical form of at least one intermediate statement generation guideline 141. In at least some embodiments, an intermediate database interaction statement 181 is any database interaction statement determined based on the primary database interaction statement 132, wherein at least one transformed database interaction statement 199 can be determined based on at least one property (e.g., output of execution) associated with the intermediate database interaction statement 181. In some embodiments, the one or more intermediate statement generation guidelines 141 comprise the following guideline (the "constant-function intermediate statement generation guideline"):
```
If DETERMINANT_FACTOR = CONSTANT_RETURNING_FUNCTION, then, for each
Constant in a CASE predicate, determine the intermediate database interaction
statement:
    SELECT CASE WHERE CONSTANT =
    CONSTANT_RETURNING_FUNCTION Then 1 ELSE 0 END FROM TABLE;
```

Guideline 1

Based on the intermediate statement generation guideline 141 in Guideline 1, if the DETERMINANT_FACTOR is a CONSTANT_RETURNING_FUNCTION, then the intermediate database interaction statement 181 must comply with the following intermediate statement pattern (the "constant-function intermediate statement pattern"): SELECT CASE WHEN CONSTANT=CONSTANT_RETURNING_FUNCTION Then 1 ELSE 0 END FROM TABLE. In some embodiments, the constant-function intermediate pattern comprises: (i) a SELECT statement with a CASE predicate, wherein the case predicate includes a WHEN predicate; and (ii) the WHEN predicate tests for the equality of a constant value in a statement complying with the sum constant pattern with a constant returning function in the statement complying with the sum constant pattern; and (iii) the potential incrementing of the value of a jump factor based on the result of the aforementioned equality test.

In some embodiments, the one or more intermediate statement generation guidelines 141 comprise the following guidelines (the "constant-literal intermediate statement generation guideline"):

```
If DETERMINANT_FACTOR = CONSTANT_VALUE, then determine the following
intermediate database interaction statement:
    SELECT 1 WHERE CONSTANT = CONSTANT_VALUE FROM TABLE;
```

Guideline 2

Based on the intermediate statement generation guideline 141 in Guideline 2, if the DETERMINANT_FACTOR is a CONSTANT_VALUE, then the intermediate database interaction statement 181 must comply with the following intermediate statement pattern (the "constant-literal intermediate statement pattern"): SELECT 1 WHERE CONSTANT=CONSTANT_VALUE FROM TABLE. In some embodiments, the constant-literal intermediate statement pattern comprises a SELECT statement that includes a number 1 as its sole parameter and includes a WHERE predicate, wherein the WHERE predicate tests for the equality of a constant value in a statement complying with the sum constant pattern with another constant value in the statement complying with the sum constant pattern.

In an exemplary embodiment, the following two intermediate database interaction statements 181 are generated based on the primary database interaction statement 132 in Example 1 and the constant-function intermediate statement generation guideline presented in Guideline 2:

```
SELECT CASE WHEN X'202020'=SUBSTR(X'4040404040',1,3)
THEN 1 ELSE 0 END
    FROM T1;
SELECT CASE WHEN X'404040'=SUBSTR(X'4040404040',1,3)
THEN 1 ELSE 0 END
    FROM T1;
```

Example 2

In the embodiment depicted in FIG. 2, the database statement transformation program 110 uses at least one property (e.g., output of execution) associated with at least one intermediate database interaction statement 181 and one or more intermediate statement evaluation guidelines 151 to determine at least one intermediate statement transformation indicator 191 associated with the at least one intermediate database interaction statement 181. In at least some embodiments, an intermediate statement evaluation guideline 151 is any combination of one or more data artefacts that, directly or when interpreted along with other one or more data artefacts, indicate how to interpret at least one property (e.g., output of execution) associated with the with at least one intermediate database interaction statement 181 to determine at least one at least one intermediate statement transformation indicator 191 associated with the at least one intermediate database interaction statement 181. In at least some embodiments, an intermediate statement transformation indicator 191 associated with at least one intermediate database interaction statement 181 is any combination of one or more data artefacts that, directly or when interpreted along with other one or more data artefacts, indicate at least one information artefact about how to determine at least one transformed database interaction statement 199 based on the at least one intermediate database interaction statement 181. In some embodiments, the one or more intermediate statement evaluation guidelines 151 comprise the following guideline (the "count-constant intermediate statement evaluation guideline"):

If executing the intermediate database interaction statement produces the output 1, determine a transformed database interaction statement based on a count-constant transformed statement pattern.

Guideline 3

In some embodiments, the one or more intermediate statement evaluation guidelines 151 comprise the following guideline (the "zero-constant intermediate statement evaluation guideline"):

If executing the intermediate database interaction statement produces the output 0, determine a transformed database interaction statement based on a zero-constant transformed statement pattern.

Guideline 4

In the embodiment depicted in FIG. 2, the database statement transformation program 110 uses the one or more intermediate statement transformation indicators 191 and the one or more transformed statement generation patterns 161 to determine at least one transformed database interaction statement 199. In at least some embodiments, a transformed statement generation pattern 161 is any combination of one or more data artefacts that, directly or when interpreted along with other one or more data artefacts, indicate at least one information artefact about at least one syntactical property associated with at least one transformed database interaction statement 199. In some embodiments, the one or more transformed statement patterns comprise the following pattern (the "count-constant transformed statement pattern"):

SELECT COUNT (*) * Jump_Factor_1;

Pattern 2

In some embodiments, the count-constant transformed statement pattern comprises a SELECT statement with a parameter comprising the multiplication of COUNT (*) and a jump factor in a statement complying with the sum constant pattern. In some embodiments, the one or more transformed statement patterns comprise the following pattern (the "zero-constant transformed statement pattern"):
SELECT 0;

Pattern 3

In some embodiments, the zero-constant transformed statement pattern comprises a SELECT statement with number 0 as a parameter.

In an exemplary embodiment, the database statement transformation program 110 determines the following transformed database interaction statement 199 based on the primary database modification statement 132 in Example 1, the intermediate database interaction statements 181 in Example 2, and the intermediate statement evaluation guideline in Guidelines 3 and 4:

```
SELECT COUNT (*),
    0 AS X20,
    COUNT (*) *2 AS X40,
        FROM T1
        WHERE WHRG_SCHL_ISO = X'404040';
```

Example 3

In the embodiment depicted in Example 3, the portion of the statement "0 AS X20" is determined based on the zero-constant transformed statement pattern, while the portion of the statement "COUNT (*) * 2 AS X40" is determined based on the count-constant transformed statement pattern.

Figure 3:
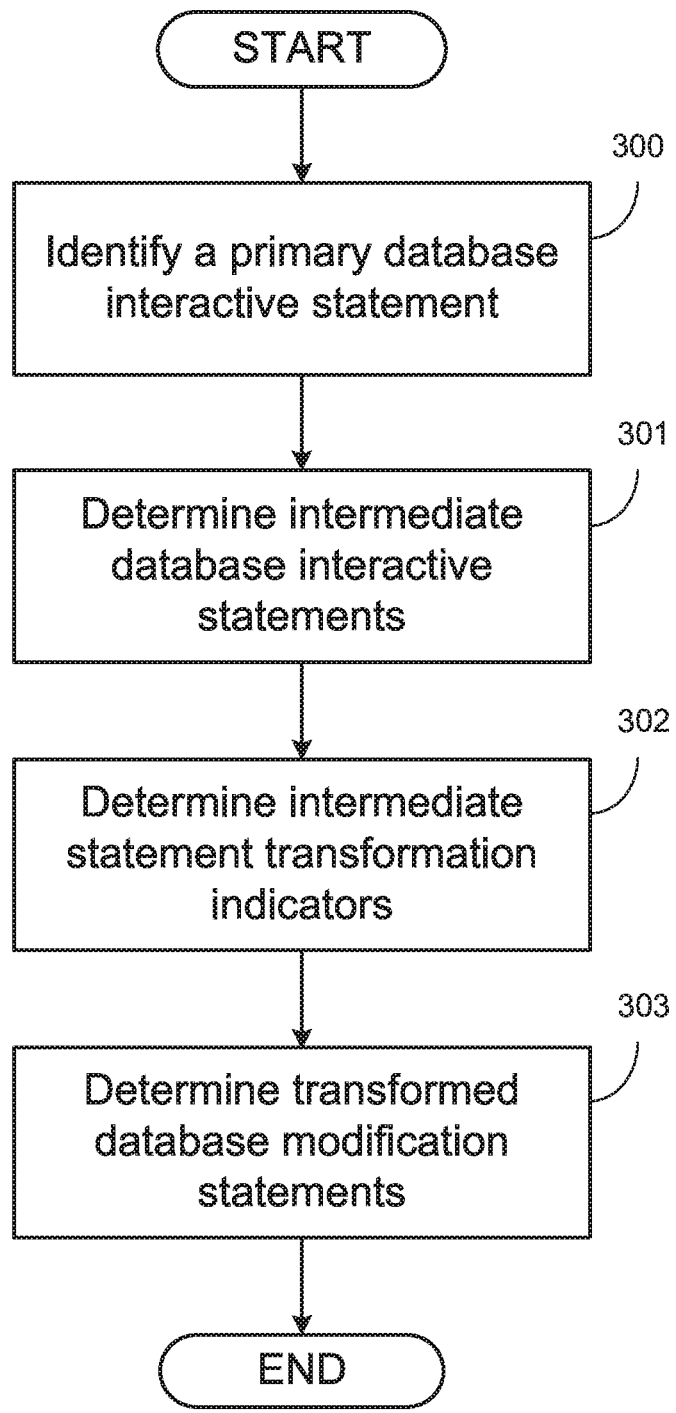
FIG. 3 is a flowchart diagram of a database statement transformation program, in accordance with at least one embodiment of the present invention.

FIG. 3 is a flow-chart diagram of a database statement transformation program, in accordance with at least one embodiment of the present invention. At step 300, the program identifies a primary database interaction statement. At step 301, the program determines one or more intermediate database interaction statements based on the primary database interaction statement. At step 302, the program determines, for each of the one or more intermediate database interaction statements, an intermediate statement transformation indicator. At step 303, the program determines one or more or more transformed database interaction statements based on each intermediate statement transformation indicator.

The database statement transformation program identifies the primary database interaction statement at step 300. In some embodiments, the program identifies the primary database interaction statement based on at least one information artefact received from a database development platform. In some embodiments, the program periodically scans one or more data artefacts associated with the database development platform (e.g., through an application programming interface provided by the database development platform) to identify the primary database interaction statement. In some embodiments, the database development platform communicates an indication of the primary database interaction statement to the program. In some embodiments, the program identifies the primary database interaction statement based on at least one information artefact received from at least one user of the computer system environment comprising the program. In some embodiments, the primary database interaction statement is a select query in a structured query language.

The database statement transformation program determines one or more intermediate database interaction statements at step 301. In some embodiments, the program determines the one or more intermediate database interaction statements based on one or more intermediate statement generation guidelines. In some embodiments, the program determines the one or more intermediate database interaction statements based on at least one information artefact received from a database development platform. In some embodiments, the program determines the one or more intermediate database interaction statements based on at least one information artefact received from at least one user of the computer system environment comprising the program. In some embodiments, the primary database interaction statement is a select query in a structured query language.

In some embodiments, the database statement transformation program further comprises determining a transformation eligibility indicator associated with the primary database interaction statement; and determining the one or more intermediate database interaction statements is performed responsive to the transformation eligibility indicator indicating that the primary database interaction statement is eligible for at least one syntactical transformation. In some embodiments, determining the transformation eligibility indicator further comprises identifying one or more transformation eligibility patterns; and determining whether the primary modification statement complies with at least one of the one or more transformation eligibility patterns. In some embodiments, the one or more transformation eligibility patterns comprises a sum-constant pattern; each of the one or more intermediate database interaction statements are determined based on least one intermediate statement pattern selected from the group consisting of: a constant-function intermediate statement pattern and a constant-literal intermediate statement pattern; and each of the one or more transformed database interaction statements are determined based on least one transformed statement patterns selected from the group consisting of: a count-constant transformed statement pattern and a zero-constant transformed statement pattern. In some embodiments, at least one of said one or more transformation eligibility patterns comprise the following syntactical pattern:

```
SELECT ...
[CASE WHEN COLUMN = CONSTANT THEN JUMP_FACTOR_1
ELSE JUMP_FACTOR_2 END,]_n
WHERE ... COLUMN = DETERMINANT_FACTOR
FROM TABLE.
```

The database statement transformation program determines each intermediate statement transformation indicator at step 302. In some embodiments, the program determines each intermediate statement transformation indicator based on at least one intermediate statement evaluation guideline. In some embodiments, the program determines each intermediate statement transformation indicator based on at least one information artefact received from a database development platform. In some embodiments, the program determines each intermediate statement transformation indicator based on at least one information artefact received from at least one user of the computer system environment comprising the program.

In some embodiments, the database statement transformation program further comprises identifying, for each of the one or more intermediate database interaction statements, an intermediate output data segment and identifying one or more intermediate statement evaluation guidelines. In at least some of those embodiments, determining each intermediate statement transformation indicator is performed based on each intermediate output data segment and the one or more intermediate statement evaluation guidelines. In some embodiments, the one or more intermediate statement evaluation guidelines are selected from the group consisting of: a count-constant intermediate statement evaluation guideline and a zero-constant intermediate statement evaluation guideline. In at least some embodiments, an intermediate output data segment associated with an intermediate database interaction statement is any combination of one or more data artefacts that, directly or when interpreted with one or more other data artefacts, indicate at least one information artefact about the result and/or output of execution of the intermediate database interaction statement at one time during regular and non-exceptional executions. In at least some embodiments, a data segment is any combination of one or more data artefacts, whether or not those one or more data artefacts are stored contiguously or not.

The database statement transformation program determines the one or more transformed database interaction statements at step 303. In some embodiments, the program determines the one or more transformed database interaction statements based on based on at least one information artefact received from at least one user of the computer system environment comprising the program. In some embodiments, the program determines the one or more transformed database interaction statements based on at least one information artefacts estimating the speed and/or other execution-related property of each transformed database interaction statements. In some embodiments, the program determines the one or more transformed database interaction statements based on at least transformed statement generation guideline.

In some embodiments, the database statement transformation program operates as part of a software development platform for executing database interaction statements, such as an optimization unit within a query compiler in a database management system. In some other embodiments, the database statement transformation program operates as a stand-alone software platform with which at least one other computer (hardware or software) component and/or at least one computer user interact to determine at least one syntactical transformation of at least one database interaction statement.

Embodiments of the present invention enable transformation of database interaction statements in a manner that enhances their performance and/or simplicity. The inventors have recognized a general technique for such transformation as well as the guidelines and patterns needed for an example of such transformation. The inventors have recognized that, through such transformations, the performance and/or simplicity of database interaction statements can be increased. Nevertheless, the aforementioned advantages are not required to be present in all of the embodiments of the invention and may not be present in all of the embodiments of the invention.

In general, one or more steps associated with different embodiments of the database statement transformation program may be performed based on one or more pieces of information obtained directly or indirectly from one or more computer (hardware or software) components, one or more pieces of information obtained directly or indirectly from one or more inputs from one or more users, and/or one or more observed behaviors associated with one or more (hardware or software) components of one or more computer system environments. In general, one or more steps of different embodiments of the database statement transformation program may comprise communicating with one or more computer (hardware or software) components, issuing one or more computer instructions (e.g., one or more special purpose machine-level instructions defined in the instruction set of one or more computer hardware components), and/or communicating with one or more computer components at the hardware level.

Figure 4:
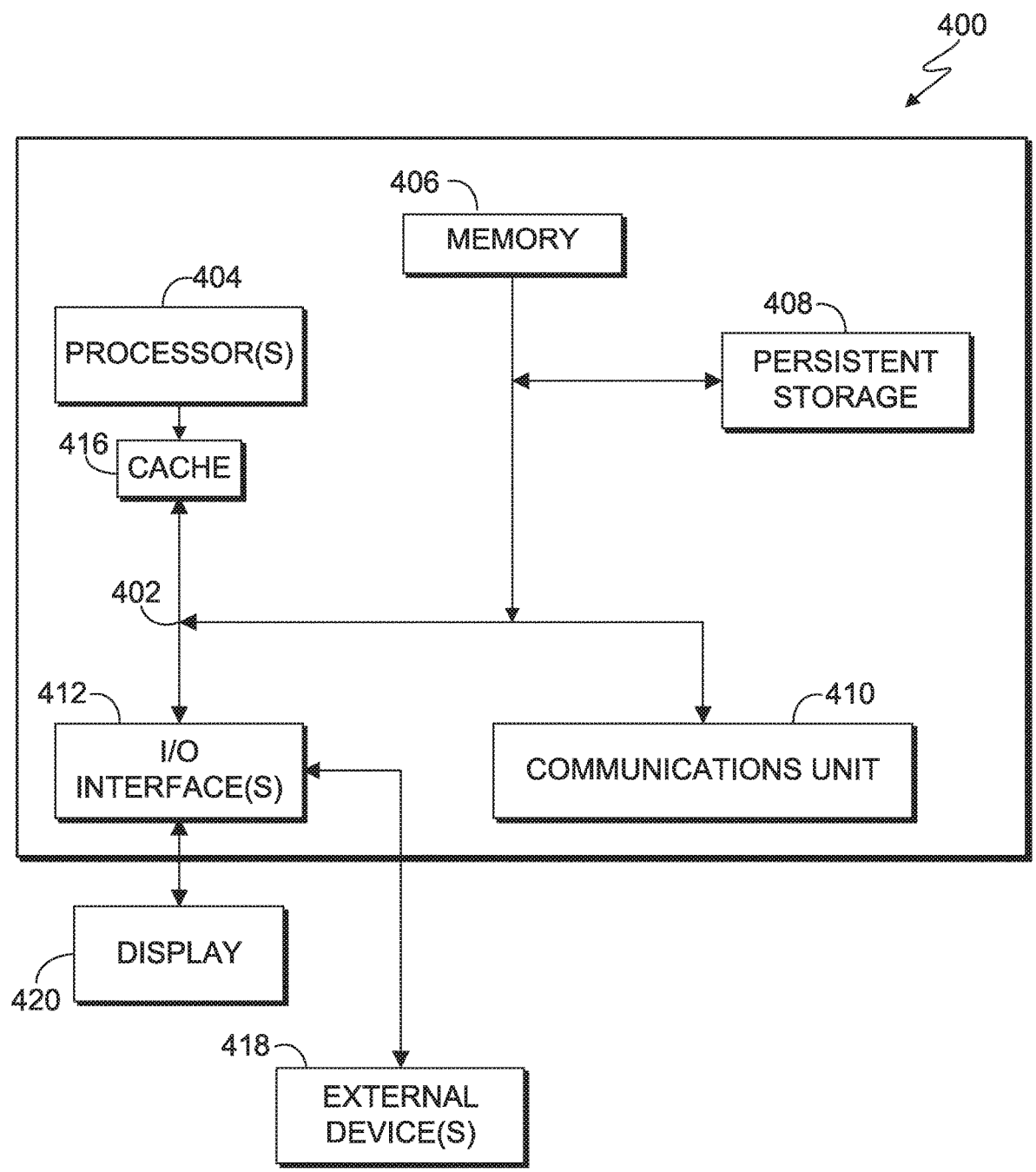
FIG. 4 is a block diagram of a computing apparatus suitable for executing a database statement transformation program, in accordance with at least one embodiment of the present invention.

FIG. 4 is a block diagram depicting components of a computer 400 suitable for executing the database statement transformation program. FIG. 4 displays the computer 400, the one or more processor(s) 404 (including one or more computer processors), the communications fabric 402, the memory 406, the RAM, the cache 416, the persistent storage 408, the communications unit 410, the I/O interfaces 412, the display 420, and the external devices 418. It should be appreciated that FIG. 4 provides only an illustration of one embodiment and does not imply any limitations with regard to the environments in which different embodiments may be implemented. Many modifications to the depicted environment may be made.

As depicted, the computer 400 operates over a communications fabric 402, which provides communications between the cache 416, the computer processor(s) 404, the memory 406, the persistent storage 408, the communications unit 410, and the input/output (I/O) interface(s) 412. The communications fabric 402 may be implemented with any architecture suitable for passing data and/or control information between the processors 404 (e.g., microprocessors, communications processors, and network processors, etc.), the memory 406, the external devices 418, and any other hardware components within a system. For example, the communications fabric 402 may be implemented with one or more buses or a crossbar switch.

The memory 406 and persistent storage 408 are computer readable storage media. In the depicted embodiment, the memory 406 includes a random access memory (RAM). In general, the memory 406 may include any suitable volatile or non-volatile implementations of one or more computer readable storage media. The cache 416 is a fast memory that enhances the performance of computer processor(s) 404 by holding recently accessed data, and data near accessed data, from memory 406.

Program instructions for the database statement transformation program may be stored in the persistent storage 408 or in memory 406, or more generally, any computer readable storage media, for execution by one or more of the respective computer processors 404 via the cache 416. The persistent storage 408 may include a magnetic hard disk drive. Alternatively, or in addition to a magnetic hard disk drive, the persistent storage 408 may include, a solid state hard disk drive, a semiconductor storage device, read-only memory (ROM), electronically erasable programmable read-only memory (EEPROM), flash memory, or any other computer readable storage media that is capable of storing program instructions or digital information.

The media used by the persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of the persistent storage 408.

The communications unit 410, in these examples, provides for communications with other data processing systems or devices. In these examples, the communications unit 410 may include one or more network interface cards. The communications unit 410 may provide communications through the use of either or both physical and wireless communications links. The database statement transformation program may be downloaded to the persistent storage 408 through the communications unit 410. In the context of some embodiments of the present invention, the source of the various input data may be physically remote to the computer 400 such that the input data may be received and the output similarly transmitted via the communications unit 410.

The I/O interface(s) 412 allows for input and output of data with other devices that may operate in conjunction with the computer 400. For example, the I/O interface 412 may provide a connection to the external devices 418, which may include a keyboard, keypad, a touch screen, and/or some other suitable input devices. External devices 418 may also include portable computer readable storage media, for example, thumb drives, portable optical or magnetic disks, and memory cards. Software and data used to practice embodiments of the present invention may be stored on such portable computer readable storage media and may be loaded onto the persistent storage 408 via the I/O interface(s) 412. The I/O interface(s) 412 may similarly connect to a display 420. The display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer program product, the computer program product comprising:
one or more computer readable storage media; and
computer code stored on said one or more computer readable storage media, with the computer code including instructions for causing a processor(s) set to perform operations including the following:
receiving a primary database interaction statement in SQL,
determining that the primary database interaction statement includes at least one SQL case statement portion, including a first SQL case statement portion,
determining that the first SQL case statement portion is eligible for an SQL query optimization transformation based, at least in part, on comparing the first SQL case statement portion against a set of SQL transformation patterns, where a first SQL transformation pattern is an SQL case statement which evaluates an equation with a constant-returning function on one side of the equation, and a second SQL transformation pattern is an SQL case statement which evaluates an equation with a constant value on one side of the equation,
responsive to determining that the first SQL case statement portion comparison yielded a match with the first SQL transformation pattern, generating, by machine logic, a first set of intermediate SQL database interaction statements based, at least in part, on the first SQL case statement portion and a set of SQL intermediate statement guidelines corresponding to the set of SQL transformation patterns, where the set of SQL intermediate statement guidelines includes at least a first SQL intermediate statement guideline corresponding to the first SQL transformation pattern, where the first SQL intermediate statement guideline stipulates that, for each given constant in the first SQL case statement portion, generate a select case statement which returns an integer value of 1 if the given constant is equal to output of the constant-returning function and a value of 0 if they are not equal,
responsive to generating at least one SQL intermediate statement based upon the first SQL intermediate statement guideline and the first SQL case statement portion, for each given SQL intermediate statement of the first set of intermediate SQL interaction statements, determining, by machine logic, the results of the given SQL intermediate statement of the first set of intermediate SQL interaction statements,
selecting, by machine logic, a first SQL intermediate statement transformation indicator from a set of SQL intermediate statement indicators based, at least in part, on the determined results of at least one SQL intermediate statement of the first set of intermediate SQL interaction statements, where the first SQL intermediate statement transformation indicator indicates replacing the first SQL case statement portion of the primary database interaction statement with a count function multiplied by a numerical value, where the numerical value is based upon the determined results of the at least one SQL intermediate statement of the first set of intermediate SQL interaction statements, and
transforming the primary database interaction statement into a transformed database interaction, where the transformed database interactions statement includes replacement of the first SQL case statement portion of the primary database interaction statement with a first transformed SQL query portion that is based on the selected first SQL intermediate transformation indicator, where execution of the transformed database interaction statement requires reduced computation resources relative to the primary database interaction statement.

2. The computer program product of claim 1, wherein the computer code further includes instructions for causing the processor(s) set to perform the following operations:
communicating the transformed database interaction statement to a database system in place of the primary database interaction statement.

3. The computer program product of claim 2, wherein the computer code further includes instructions for causing the processor(s) set to perform the following operations:
performing, by the database system, the transformed database interaction statement on a database.

4. The computer program product of claim 1, wherein: primary database interaction statement includes a second SQL case statement portion; and
the transformed database interaction statement includes the second SQL case statement portion.

5. The product of claim 4, wherein the set of SQL intermediate statement guidelines corresponding to the set of SQL transformation patterns includes a second SQL intermediate statement guideline corresponding to the second SQL transformation pattern; and the second SQL intermediate statement guideline stipulates that, for each given constant in the second SQL case statement portion, generate a select statement which returns an integer value of 1 if the given constant is equal to output of the constant value.

6. The product of claim 5, wherein the computer code further includes instructions for causing the processor(s) set to perform the following operations:

determining that the second SQL case statement portion is eligible for an SQL query optimization transformation based, at least in part, on comparing the second SQL case statement portion against the set of SQL transformation patterns; and responsive to determining that the second SQL case statement portion comparison yielded a match with the second SQL transformation pattern, generating, by machine logic, a second set of intermediate SQL database interaction statements based, at least in part, on the second SQL case statement portion and the set of SQL intermediate statement guidelines corresponding to the set of SQL transformation patterns;

responsive to generating at least one SQL intermediate statement based upon the second SQL intermediate statement guideline and the second SQL case statement portion, for each given SQL intermediate statement of the second set of intermediate SQL database interaction statements, determining, by machine logic, the results of the given SQL intermediate statement of the second set of intermediate SQL database interaction statements;

selecting, by machine logic, a second SQL intermediate statement transformation indicator from the set of SQL intermediate statement indicators based, at least in part, on the determined results of at least one SQL intermediate statement of the second set of intermediate SQL database interaction statements, where the second SQL intermediate statement transformation indicator indicates replacing the second SQL case statement portion of the transformed database interaction statement with a count function multiplied by a numerical value, where the numerical value is based upon the determined results of the at least one SQL intermediate statement based upon the second SQL intermediate statement guideline, and transforming the transformed database interaction statement into a second transformed database interaction, where the second transformed database interactions statement includes replacement of the second SQL case statement portion of the transformed database interaction statement with a second transformed SQL query portion that is based on the selected second SQL intermediate transformation indicator, where execution of the second transformed database interaction statement requires reduced computation resources relative to the primary database interaction statement and the transformed database interaction statement.

7. The product of claim 6, wherein:
the primary database interaction statement includes a third SQL case statement portion; and
the second transformed database interaction statement includes the third SQL case statement portion.

8. The product of claim 7, wherein the computer code further includes instructions for causing the processor(s) set to perform the following operations:

determining that the third SQL case statement portion is eligible for an SQL query optimization transformation based, at least in part, on comparing the third SQL case statement portion against the set of SQL transformation patterns; and responsive to determining that the third SQL case statement portion comparison yielded a match with at least one SQL transformation pattern, generating, by machine logic, a third set of intermediate SQL database interaction statements based, at least in part, on the third SQL case statement portion and the set of SQL intermediate statement guidelines corresponding to the set of SQL transformation patterns;

responsive to generating at least one SQL intermediate statement based upon at least one SQL intermediate statement guideline and the third SQL case statement portion, for each given SQL intermediate statement the third set of intermediate SQL database interaction statements, determining, by machine logic, the results of the given SQL intermediate statement of the third set of intermediate SQL database interaction statements;

responsive to determining that the results of the third set of intermediate SQL database interaction statements indicates a numerical value of zero, selecting, by machine logic, a third SQL intermediate statement transformation indicator from the set of SQL intermediate statement indicators based, at least in part, on the determined results of at least one intermediate SQL database interaction statement of the third set of intermediate SQL database interaction statements, where the third SQL intermediate statement transformation indicator indicates replacing the third SQL case statement portion of the second transformed database interaction statement with a numerical value of zero, and transforming the second transformed database interaction statement into a third transformed database interaction, where the third transformed database interactions statement includes replacement of the third SQL case statement portion of the second transformed database interaction statement with a third transformed SQL query portion that is based on the selected third SQL intermediate transformation indicator, where execution of the third transformed database interaction statement requires reduced computation resources relative to: (i) the primary database interaction statement, (ii) the transformed database interaction statement, and (iii) the second transformed database interaction statement.

9. The product of claim 1, wherein the primary database interaction statement is received from periodically scanning a data set to identify database interaction statements.

10. A computer system (CS) comprising:
a processor(s) set;
a machine readable storage device; and
computer code stored on the machine readable storage device, with the computer code including instructions for causing the processor(s) set to perform operations including the following:

receiving a primary database interaction statement in SQL, determining that the primary database interaction statement includes at least one SQL case statement portion, including a first SQL case statement portion, the first SQL case statement portion is eligible for an SQL query optimization transformation based, at least in part, on comparing the first SQL case statement portion against a set of SQL transformation patterns, where a first SQL transformation pattern is an SQL case statement which evaluates an equation with a constant-returning function on one side of the equation, and a second SQL transformation pattern is an SQL case statement which evaluates an equation with a constant value on one side of the equation, responsive to determining that the first SQL case statement portion comparison yielded a match with the first SQL transformation pattern, generating, by machine logic, a first set of intermediate SQL database interaction statements based, at least in part, on the first SQL case statement portion and a set of SQL intermediate statement guidelines corresponding to the set of SQL transformation patterns, where the set of SQL intermediate statement guidelines includes at least a first SQL intermediate statement guideline corresponding to the first SQL transformation pattern, where the first SQL intermediate statement guideline stipulates that, for each given constant in the first SQL case statement portion, generate a select case statement which returns an integer value of 1 if the given constant is equal to output of the constant-returning function and a value of 0 if they are not equal, responsive to generating at least one SQL intermediate statement based upon the first SQL intermediate statement guideline and the first SQL case statement portion, for each given SQL intermediate statement of the first set of intermediate SQL interaction statements, determining, by machine logic, the results of the given SQL intermediate statement of the first set of intermediate SQL interaction statements, selecting, by machine logic, a first SQL intermediate statement transformation indicator from a set of SQL intermediate statement indicators based, at least in part, on the determined results of the at least one SQL intermediate statement of the first set of intermediate SQL interaction statements, where the first SQL intermediate statement transformation indicator indicates replacing the first SQL case statement portion of the primary database interaction statement with a count function multiplied by a numerical value, where the numerical value is based upon the determined results of the at least one SQL intermediate statement of the first set of intermediate SQL interaction statements, and transforming the primary database interaction statement into a transformed database interaction, where the transformed database interactions statement includes replacement of the first SQL case statement portion of the primary database interaction statement with a first transformed SQL query portion that is based on the selected first SQL intermediate transformation indicator, where execution of the transformed database interaction statement requires reduced computation resources relative to the primary database interaction statement.

11. The CS of claim 10, the computer code further includes instructions for causing the processor(s) set to perform the following operations:

communicating the transformed database interaction statement to a database system in place of the primary database interaction statement.

12. The CS of claim 11, wherein the computer code further includes instructions for causing the processor(s) set to perform the following operations:

performing, by the database system, the transformed database interaction statement on a database.

13. The CS of claim 10, wherein:

the primary database interaction statement includes a second SQL case statement portion; and the transformed database interaction statement includes the second SQL case statement portion.

14. The CS of claim 10, wherein the set of SQL intermediate statement guidelines corresponding to the set of SQL transformation patterns includes a second SQL intermediate statement guideline corresponding to the second SQL transformation pattern; and the second SQL intermediate statement guideline stipulates that, for each given constant in the second SQL case statement portion, generate a select statement which returns an integer value of 1 if the given constant is equal to output of the constant value.

15. The CS of claim 14, wherein the computer code further includes instructions for causing the processor(s) set to perform the following operations:

determining that the second SQL case statement portion is eligible for an SQL query optimization transformation based, at least in part, on comparing the second SQL case statement portion against the set of SQL transformation patterns; and responsive to determining that the second SQL case statement portion comparison yielded a match with the second SQL transformation pattern, generating, by machine logic, a second set of intermediate SQL database interaction statements based, at least in part, on the second SQL case statement portion and the set of SQL intermediate statement guidelines corresponding to the set of SQL transformation patterns;

responsive to generating at least one SQL intermediate statement based upon the second SQL intermediate statement guideline and the second SQL case statement portion, for each given SQL intermediate statement of the second set of intermediate SQL database interaction statements, determining, by machine logic, the results of the given SQL intermediate statement of the second set of intermediate SQL database interaction statements;

selecting, by machine logic, a second SQL intermediate statement transformation indicator from the set of SQL intermediate statement indicators based, at least in part, on the determined results of at least one SQL intermediate statement of the second set of intermediate SQL database interaction statements, where the second SQL intermediate statement transformation indicator indicates replacing the second SQL case statement portion of the transformed database interaction statement with a count function multiplied by a numerical value, where the numerical value is based upon the determined results of the at least one SQL intermediate statement based upon the second SQL intermediate statement guideline, and transforming the transformed database interaction statement into a second transformed database interaction, where the second transformed database interactions statement includes replacement of the second SQL case statement portion of the transformed database interaction statement with a second transformed SQL query portion that is based on the selected second SQL intermediate transformation indicator, where execution of the second transformed database interaction statement requires reduced computation resources relative to the primary database interaction statement and the transformed database interaction statement.

16. The CS of claim 15, wherein:
the primary database interaction statement includes a third SQL case statement portion; and
the second transformed database interaction statement includes the third SQL case statement portion.

17. The CS of claim 16, wherein the computer code further includes instructions for causing the processor(s) set to perform the following operations:
determining that the third SQL case statement portion is eligible for an SQL query optimization transformation based, at least in part, on comparing the third SQL case statement portion against the set of SQL transformation patterns; and
responsive to determining that the third SQL case statement portion comparison yielded a match with at least one SQL transformation pattern, generating, by machine logic, a third set of intermediate SQL database interaction statements based, at least in part, on the third SQL case statement portion and the set of SQL intermediate statement guidelines corresponding to the set of SQL transformation patterns;
responsive to generating at least one SQL intermediate statement based upon at least one SQL intermediate statement guideline and the third SQL case statement portion, for each given SQL intermediate statement the third set of intermediate SQL database interaction statements, determining, by machine logic, the results of the given SQL intermediate statement of the third set of intermediate SQL database interaction statements;
responsive to determining that the results of the third set of intermediate SQL database interaction statements indicates a numerical value of zero, selecting, by machine logic, a third SQL intermediate statement transformation indicator from the set of SQL intermediate statement indicators based, at least in part, on the determined results of at least one intermediate SQL database interaction statement of the third set of intermediate SQL database interaction statements, where the third SQL intermediate statement transformation indicator indicates replacing the third SQL case statement portion of the second transformed database interaction statement with a numerical value of zero, and
transforming the second transformed database interaction statement into a third transformed database interaction, where the third transformed database interactions statement includes replacement of the third SQL case statement portion of the second transformed database interaction statement with a third transformed SQL query portion that is based on the selected third SQL intermediate transformation indicator, where execution of the third transformed database interaction statement requires reduced computation resources relative to: (i) the primary database interaction statement, (ii) the transformed database interaction statement, and (iii) the second transformed database interaction statement.

18. The CS of claim 10, wherein the primary database interaction statement is received from periodically scanning a data set to identify database interaction statements.

* * * * *